United States Patent [19]
Nihei et al.

[11] Patent Number: 5,744,073
[45] Date of Patent: Apr. 28, 1998

[54] FABRICATION OF FERROELECTRIC DOMAIN REVERSALS

[75] Inventors: Yasukazu Nihei; Yoji Okazaki; Akinori Harada, all of Kanagawa-ken, Japan

[73] Assignee: Fuji Photo Film Co., Ltd., Kanagawa, Japan

[21] Appl. No.: 531,280

[22] Filed: Sep. 20, 1995

Related U.S. Application Data

[63] Continuation of Ser. No. 132,277, Oct. 6, 1993, abandoned.

[30] Foreign Application Priority Data

Oct. 19, 1992 [JP] Japan ................................. 4-280001
Jan. 19, 1993 [JP] Japan ................................. 5-006599

[51] Int. Cl.$^6$ .............................. B29D 11/00; G02B 1/00
[52] U.S. Cl. .................... 264/1.21; 264/1.24; 264/1.27; 264/430
[58] Field of Search ......................... 264/1.21, 1.24, 264/430, 345, 346, 1.27, 1.36

[56] References Cited

U.S. PATENT DOCUMENTS

| | | | |
|---|---|---|---|
| 4,343,675 | 8/1982 | Anderson et al. | 156/628 |
| 4,780,239 | 10/1988 | Snyder et al. | 252/184 |
| 5,083,856 | 1/1992 | Hatori et al. | 385/7 |
| 5,138,482 | 8/1992 | Hatori et al. | 359/305 |
| 5,267,336 | 11/1993 | Sriram et al. | 385/2 |
| 5,408,492 | 4/1995 | Vossler et al. | 372/94 |

OTHER PUBLICATIONS

"Milliwatt–Order Blue–Light Generation in Periodically Domain–Inverted LiTaO$_3$ waveguide," *Optics Letters*, vol. 16, No. 15; Aug. 1, 1991; pp. 1156–1158.

"Fabrication of Periodic Domain Grating in LiNbO$_3$ by Electron Beam Writing for Application of Nonlinear Optical Processes," *Electronics Letters*, vol. 27, No. 14; Jul. 4, 1991; pp. 1211–1222.

"Interactions Between Light Waves In A Nonlinear Dielectric," *Physical Review*, vol. 121, No. 6; Sep. 15, 1962; pp. 1919–1939.

*Primary Examiner*—Christopher A. Fiorilla
*Attorney, Agent, or Firm*—Sughrue, Mion, Zinn, Macpeak & Seas, PLLC

[57] ABSTRACT

A method for fabricating domain reversals in predetermined periods without the occurrence of localized variations in refractive index. Localized areas of a unipolarized ferroelectric material which is made of an LiNbO$_3$ substrate, or the like, and possesses a nonlinear optical effect are exposed to electron beams in a predetermined pattern, so that domain reversals are defined. Thereafter, this ferroelectric material is subjected to a heat treatment at a temperature below the Curie temperature of the ferroelectric material.

19 Claims, 1 Drawing Sheet

FABRICATION OF FERROELECTRIC DOMAIN REVERSALS

This is a continuation of application Ser. No. 08/132,277 filed Oct. 6, 1993 now abandoned.

BACKGROUND OF THE INVENTION

1. Field of the Invention

This invention relates to a method for fabricating domain reversals in a predetermined pattern on a ferroelectric material possessing a nonlinear optical effect in order to form an optical wavelength converter element for converting a fundamental wave into a second harmonic wave, particularly, an optical wavelength converter element having periodic domain reversals.

2. Description of the Prior Art

A proposal has already been made by Bleombergen et al. in Physics Review vol. 127, No. 6 pp. 1918 (1962), in which the wavelength of a fundamental wave is converted into a second harmonic wave using an optical wavelength converter element with regions (domains) where the directions of spontaneous polarization of a ferroelectric material, possessing the nonlinear optical effect, are periodically inverted.

In this method, the fundamental wave can be phase matched with the second harmonic wave by setting the period $\Lambda$ of the domain reversals to be an integral multiple of a coherence length $\Lambda c$ which is given by $$\Lambda c = 2\pi / \{\beta(2\omega) - 2\beta(\omega)\} \tag{1}$$

where $\beta(2\omega)$ designates the propagation constant of the second harmonic wave, and $2\beta(\omega)$ represents the propagation constant of the fundamental wave. When wavelength conversions are effected using the bulk crystal of a nonlinear optical material, a wavelength to be phase-matched is limited to a specific wavelength inherent to the crystal. However, in accordance with the above described method, phase matching (that is, so-called pseudo phase matching) can be efficiently carried out by selecting a period A which satisfies the condition (1) for an arbitrary wavelength.

Examples of known fabrication methods for such periodic domain reversals include 1) the method proposed by H. Ito, C. Takyu, and H. Inaba in Electronics Letters, vol. 27, No. 14, pp. 1221 (1991), wherein the −z surface of unipolarized LiTaO₃ or LiNbO₃ is directly exposed to electron beams at room temperature; and 2) the method proposed by K. Yamamoto, K. Mizuuchi, and T. Taniuchi in Optics Letters. Vol. 16, No. 15, pp. 1156 (1991) wherein the −z surface of LiTaO₃ is periodically subjected to the exchange of protons, and a resultant structure undergoes a heat treatment around the Curie temperature.

Optical wavelength converter elements, fabricated by the foregoing first fabrication method, are provided with periodic domain reversals extending through a LiNbO₃ substrate (e.g. around 0.5 mm in thickness); namely, extending from the −z surface to the +z surface of the substrate. These types of elements can find applications as a bulk type optical wavelength converter element. In a wavelength converter element with third-order periodic domain reversals, fabricated in accordance with the first method, phase matching is observed in the bulk by the wavelength sweep of a Ti:Al₂O₃ laser.

Meanwhile, in the second method, the LiTaO₃ substrate is subjected to a heat treatment around the Curie temperature after the proton-exchange of the substrate in order to invert directions of polarization. In other words, this heat treatment causes only the direction of polarization of regions where the Curie temperature has dropped as a result of the exchange of protons to be inverted. With respect to the practice of this second method, it is proposed that a waveguide type optical wavelength converter element be fabricated by forming third-order periodic domain reversals and then forming channel waveguides on the third-order periodic domain reversals by the exchange of protons. When this optical wavelength converter element is observed in cross section, it turns out that semi-circular periodical domain reversals are formed. When a Ti:Al₂O₃ laser is used as the light source of a fundamental wave, a second harmonic wave of 2.4 mW is outputted in response to a fundamental wave input of 99 mW, thereby achieving a wavelength conversion efficiency approximate to theoretical values at third-order periods.

This second method has difficulty sufficiently increasing the depth of the periodic domain reversals with respect to the width of inversion, and hence it is impossible to apply this method to the fabrication of an optical wavelength converter element in a bulk crystal shape.

On the contrary, according to the first method, it is possible to produce an optical wavelength converter element in a bulk crystal shape. When a bulk-crystal-shaped optical wavelength converter element, being produced by this first method and having domain reversals, is used in a cavity resonator of a laser-diode-pumped solid-state laser, it is important to suppress internal losses of the cavity resonator to a minimum in order to efficiently produce a second harmonic wave. However, the optical wavelength converter element, being produced by the first method and having domain reversals, causes localized variations in refractive index by having exposed the element to electron beams. Hence, it turned out that the incorporation of this optical wavelength converter element into the cavity resonator of the laser brought about a significant increase in internal loss.

SUMMARY OF THE INVENTION

In view of the foregoing observations and descriptions, the object of this invention is to provide a method for fabricating ferroelectric domain reversals in which domain reversals can be defined in predetermined periods without the occurrence of localized variations in refractive index.

To this end, the present invention provides a method for fabricating domain reversals, the method characterized in that domain reversals are defined by exposing localized areas of a unipolarized ferroelectric material possessing a nonlinear optical effect to a high energy beam in a predetermined pattern, and the ferroelectric material is then subjected to a heat treatment below the Curie temperature. For examples, electron beams and ion beams can be used as the above-mentioned high energy beam.

LiNbO₃ or LiTaO₃ can be used as specific examples of the foregoing ferroelectric material. When LiNbO₃ is used as a ferroelectric material, the temperature of the heat treatment should preferably be set in a range from 100 degrees Centigrade to 700 degrees Centigrade with respect to a Curie temperature of 1130 degrees Centigrade. When LiTaO₃ is used, the temperature of the heat treatment should preferably be set in a range between 100 degrees Centigrade and 600 degrees Centigrade with respect to a Curie temperature of 610 degrees Centigrade.

As mentioned above, the fabrication of domain reversals by the exposure of localized areas of a ferroelectric material to high energy beams prevents domain reversals from being diffused as it occurs by the exchange of protons, and hence it becomes possible to define domain reversals in a predetermined pattern with a superior controllability.

Also, the above heat treatment eliminates localized variations in refractive index resulting from the radiation of high energy beams. This leads to reduced scattering or diffraction of light when passing through domain reversals fabricated by this method, whereby a loss of light is suppressed. Therefore, when an optical wavelength converter element having these domain reversals is arranged in a cavity resonator of a laser as previously mentioned, internal losses of the cavity resonator are suppressed to a minimum, and hence a second harmonic wave is efficiently produced.

Since the temperature of this heat treatment is set less than the Curie point of a ferroelectric material, the polarization of the ferroelectric material oriented to specific directions by the radiation of high energy beams remain unchanged after this treatment.

DESCRIPTION OF THE PREFERRED EMBODIMENTS

Figure 1A:
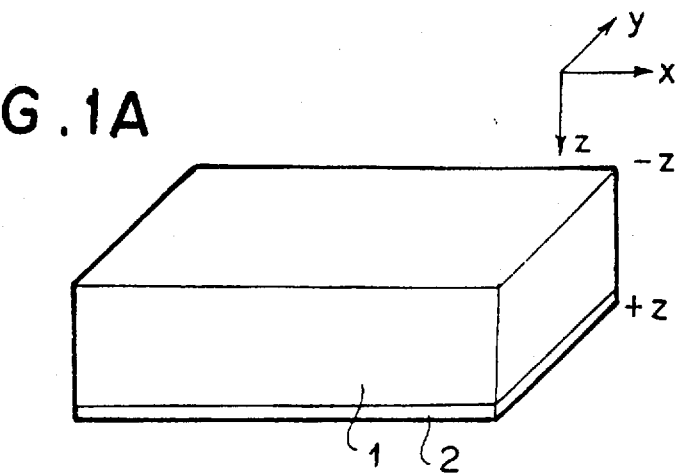
FIG. 1A and FIG. 1B are explanatory views illustrating a method for fabricating domain reversals according to this invention.

With reference to the accompanying drawings, preferred embodiments of this invention will now be described. FIG. 1 shows a process of the fabrication of domain reversals according to one embodiment of this invention. In this drawing, reference numeral 1 designates a LiTaO$_3$ substrate which acts as a ferroelectric material possessing a nonlinear optical effect. This substrate 1 is subjected to a unipolarization treatment, and is formed to a thickness of 0.5 mm. In this substrate, the z-plate of the substrate which is optically polished along its z-plane is used so that the largest nonlinear optical material constant d$_{33}$ can be effectively utilized. As shown in FIG. 1A, a Cr thin film 2 is deposited to a thickness of 30 nm on the +z-surface of this substrate 1 as a ground electrode.

Figure 1B:
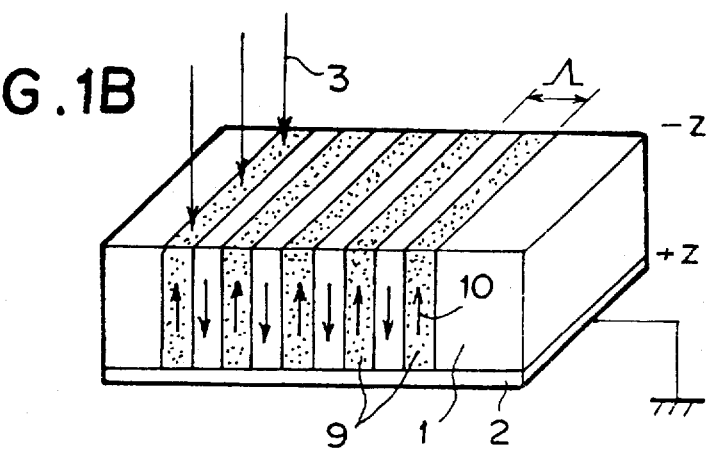

As can be seen in FIG. 1B, electron beams 3 emanating from a known non-illustrated electron beam radiation unit are irradiated onto localized areas on a substrate 1 from its −z-surface. At this time, as one example, an electron beam accelerating voltage is set in a range between 20–30 kV, and an irradiation current is set in a range between 1–30 nA. The radiation of the electron beams causes domain reversals to be periodically defined at a predetermined pitch of Λ deeply enough to reach the rear surface of the substrate 1. The arrow 10 in FIG. 1B designates directions of polarization of the ferroelectric material. The period Λ is set to 5.4 micrometers, allowing for the wavelength dispersion of the diffractive index of LiTaO$_3$, so that a first-order period can be defined around 946 nm along the x-axis of the substrate 1.

This substrate 1 then undergoes a heat treatment in the air for three hours at a temperature of 540 degrees Centigrade below the Curie temperature (610 degrees Centigrade) of LiTaO$_3$. Thus, the heat treatment at a temperature less than the Curie temperature will not change the polarization of the substrate oriented to definite directions by the irradiation of the electron beams 3.

Before and after the above mentioned heat treatment, the substrate 1 is examined from the ground x-surface by means of a polarizing microscope. If the refractive index of the substrate 1 does not suffer from localized variations but remains uniform, under the microscope, light is extinguished, and the entire view of the microscope becomes dark at a quenching point. When the substrate 1 was observed before the heat treatment, only regions exposed to the electron beams 3 remained unquenched at the quenching point, and it was admittedly observed that the refractive index was evidently changed resulting from the application of electron beams. Meanwhile, when the substrate 1 was observed after the heat treatment, the entire view turned dark, and it was admittedly observed that localized variations in the refractive index of the electron-beam-irradiated regions disappeared, and the refractive index was rendered uniform. Thus, the effect of the heat treatment can be confirmed by the observation using the polarizing microscope.

Although the electron beams 3 are used as high energy beams, ion beams may be used instead. In addition to LiTaO$_3$ set forth above, LiNbO$_3$ or MgO-LiNbO$_3$, or the like, may be used as a ferroelectric material possessing a nonlinear optical effect.

Figure 2:
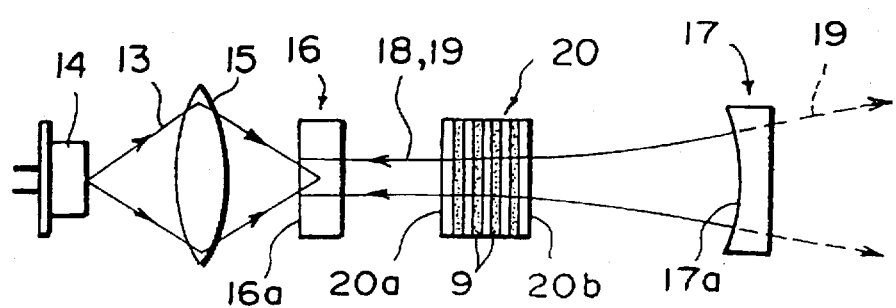
FIG. 2 is a schematic side elevation view showing a solid-state laser provided with an optical wavelength converter element on which domain reversals are defined according to this invention.

An optical wavelength converter element, made of the substrate 1 on which periodic domain reversals are defined in accordance with the above embodiment, will now be described. The x and −x surfaces of the substrate 1 after the heat treatment are polished to form light transmitting surfaces 20a and 20b. A bulk crystal type optical wavelength converter element 20 shown in FIG. 2 is obtained by removing the Cr thin film 2 if necessary. The bulk crystal type optical wavelength converter element 20 having these periodic domain reversals is disposed inside a cavity resonator of a laser-diode-pumped YAG laser.

This laser-diode-pumped YAG laser is made up of; a laser diode 14 for emanating a laser beam 13 as a pumping beam at a wavelength of 809 nm; a focusing lens 15 for converging the laser beam 13 which is in a divergent beam state; a YAG crystal 16 which is a laser medium doped with (Nd) neodymium and located at a position at which the laser beam 13 is converged; and a resonant mirror 17 disposed to the forward of the YAG crystal 16, that is, to the right in the drawing. The optical wavelength converter element 20 has a crystal length of 1 mm, and is interposed between the resonant mirror 17 and the YAG crystal 16.

The YAG crystal 16 emanates a laser beam 18 at a wavelength of 946 nm when pumped by the laser beam 13 at a wavelength of 809 nm. This solid-state laser beam 18 causes oscillation between an end surface 16a, covered with a given coating, of the YAG crystal and a mirror surface 17a of the resonant mirror 17, and then the beam enters the optical wavelength converter element 20. In this element, the beam is converted to a second harmonic wave 19 having a half wavelength, that is, a wavelength of 473 nm. The solid-state laser beam 18, which serves as a fundamental beam, and the second harmonic wave 19 are phase-matched (a so-called quasi-phase-matched) with each other in the periodic domain reversals, and only the second harmonic wave 19 appears from the resonant mirror 17.

In this embodiment, the second harmonic wave 19 having an output of 10 mW was obtained when an output of the laser diode 14 is 200 mW. This second harmonic wave 19 has a clear profile free from scattered light and stray light.

Next, an optical wavelength converter element having a crystal length of 1 mm was manufactured in the same manner as the optical wavelength converter element 20, except for that the element was not subjected to the foregoing heat treatment. This optical wavelength converter element is disposed inside a cavity resonator of the laser-diode-pumped YAG laser, and an output of the second harmonic wave was measured. When an output of the laser diode 14 was 200 mW, the output of the second harmonic wave was 0.1 mW. As stated above, it is proved that, when the optical wavelength converter element is disposed within the cavity resonator of the solid-state laser, the above-mentioned heat treatment causes internal losses of the cavity resonator to be reduced, so that a wavelength conversion efficiency of the laser is improved.

Preferred temperature ranges for the heat treatment will now be described. A plurality of $LiNbO_3$ crystals are prepared as samples. Domain reversals are defined on each of these crystals by the same electron beam scanning method as used in the previous embodiment. These $LiNbO_3$ crystals then experience the aforementioned heat treatment by adequately varying a temperature in a range between 100–1000 degrees Centigrade which is less than a Curie temperature of 1130 degrees Centigrade of the crystal. At this time, a heating rate is 30 degrees Centigrade/min.; and a temperature retaining time is two hours; and, regarding a temperature drop, the crystals are subjected to natural cooling.

When the crystals, each being subjected to different temperature heat treatment, are observed by a polarizing microscope, it is confirmed that localized variations in refractive index of electron-beam-irradiated regions disappear from all of the crystals, and hence the refractive index is rendered uniform.

On the other hand, as with the previous embodiment, a bulk crystal type optical wavelength converter element is produced from each of the crystals. Each of these optical wavelength converter elements is disposed inside a cavity resonator of a laser-diode-pumped YAG laser in the same manner as the previous embodiment. The generation of a second harmonic wave which is bluish light is seen from a sample in which a temperature T of the heat treatment is set in a range of 100 degrees Centigrade$\leq T \leq$700 degrees Centigrade. Also, the second harmonic wave produces an output of 10 mW when an output of the laser diode is 200 mW. However, the generation of the second harmonic wave is not seen from a sample in which the heat treatment temperature T is set in a range of 700 degrees Centigrade$\leq T \leq$1000 degrees Centigrade. When the shape of domain reversals of the sample, which fails to produce the second harmonic wave, is observed by etching, no periodic domain reversals are seen from the sample. It seems obvious that the directions of polarization of the domain reversals are changed by the heat treatment.

Meanwhile, in the case of a sample subjected to a heat treatment at a temperature of 100 degrees Centigrade or less, it is confirmed that localized variations in refractive index (i.e., a difference in index) of the electron-beam-irradiated regions still remain. And, as with the previous embodiment, when this sample is disposed inside the cavity resonator of the laser-diode-pumped YAG laser, the generation of the bluish second harmonic wave is observed. However, an output of a resultant second harmonic wave is only 0.1 mW with respect to an output of 200 mW of the laser diode. This is attributed to an increase in internal loss caused by the scattering of a fundamental wave due to a difference in refractive index. As a result of this, it is evident that a heat treatment at less than 100 degrees Centigrade is of no effect.

Hence, when the present invention is applied to $LiNbO_3$, it can be said that the heat treatment temperature T should be set in a range of 100 degrees Centigrade$\leq T \leq$700 degrees Centigrade.

A plurality of samples made of $LiTaO_3$, the Curie temperature of which is 610 degrees Centigrade, are prepared. Domain reversals are defined on each of these samples by the same electron beam scanning method as employed in the previous embodiment. The range of temperatures of the heat treatment is set in a range between 100 degrees Centigrade and 600 degrees Centigrade which is less than a Curie temperature of 610 degrees. At this time, a heating rate is 30 degrees Centigrade/min.; and a temperature retaining time is two hours; and, regarding a temperature drop, the crystals are subjected to natural cooling.

When the crystals, each being subjected to different temperature heat treatment, are observed by a polarizing microscope, it is confirmed that localized variations in refractive index of electron-beam-irradiated regions disappear from all of the crystals, and hence the refractive index is rendered uniform.

On the other hand, as with the previous embodiment, a bulk crystal type optical wavelength converter element is produced from each of the crystals. Each of these optical wavelength converter elements is disposed inside a cavity resonator of a laser-diode-pumped YAG laser in the same manner as the previous embodiment. The generation of a second harmonic wave which is bluish light is seen from a sample in which a temperature T of the heat treatment is set in a range of 100 degrees Centigrade$\leq T \leq$600 degrees Centigrade. Also, the second harmonic wave produces an output of 10 mW when an output of the laser diode is 200 mW. However, the generation of the second harmonic wave is not seen from a sample in which the heat treatment temperature T is set in a range of 600 degrees Centigrade$\leq T \leq$610 degrees Centigrade.

Meanwhile, in the case of a sample subjected to a heat treatment at a temperature of 100 degrees Centigrade or less, it is confirmed that localized variations in refractive index (i.e., a difference in index) of the electron-beam-irradiated regions still remain. And, as with the previous embodiment, when this sample is disposed inside the cavity resonator of the laser-diode-pumped YAG laser, the generation of the bluish second harmonic wave is observed. However, an output of a resultant second harmonic wave is only 0.1 mW with respect to a 200 mW output of the laser diode. This is attributed to an increase in internal loss caused by the scattering of a fundamental wave due to a difference in refractive index. As a result of this, it is evident that a heat treatment at less than 100 degrees Centigrade is of no effect.

Hence, when the present invention is applied to $LiTaO_3$, it can be said that the heat treatment temperature T should be set in a range of 100 degrees Centigrade$\leq T \leq$600 degrees Centigrade.

The ferroelectric material on which domain reversals are defined according to this invention can be applied to an optical wavelength converter element for use with an external resonator type laser by subjecting the ferroelectric material to adequate polishing and coating so that it can be an element of a ring resonator. Even in this case, the same results and effects as yielded when the ferroelectric material is applied to a laser-diode-pumped solid-state laser.

Further, according to this invention, depending on the setting of a pattern to be exposed to high energy beams, a period of the domain reversals can be arbitrarily set.

It will be understood that the above description of the present invention is susceptible to various modifications, changes, and adaptations and that the same are intended to be comprehended within the meaning and range of equivalents of the appended claims.

What is claimed is:

1. A method for fabricating domain reversals, the method characterized in that domain reversals are defined by exposing localized surface areas of a unpolarized ferroelectric material, which possesses a nonlinear optical effect, to high energy beams in a predetermined pattern to create a charge on said localized surface areas and thereby establish an electric field between said localized surface areas and corresponding localized surface areas on the opposite side of said ferroelectric material, and the ferroelectric material is then subjected to a heat treatment hot enough to render uniform the refractive index of said ferroelectric material which was subjected to said electric field, said heat treatment being below the Curie temperature of the ferroelectric material.

2. A method for fabricating domain reversals as defined in claim 1, wherein the high energy beams are electron beams.

3. A method for fabricating domain reversals as defined in claim 2, wherein the ferroelectric material is a $LiNb_xTa_{(1-x)}O_3$ ($0 \leq x \leq 1$) substrate.

4. A method for fabricating domain reversals as defined in claim 3, wherein the ferroelectric material is a $LiNbO_3$ substrate, and a temperature of the heat treatment is set to a range between 100 degrees Centigrade and 700 degrees Centigrade.

5. A method for fabricating domain reversals as defined in claim 3, wherein the ferroelectric material is a $LiNbO_3$ substrate, and a temperature of the heat treatment is set to a range between 100 degrees Centigrade and 600 degrees Centigrade.

6. A method for fabricating domain reversals as defined in claim 2, wherein the ferroelectric material is a MgO-$LiNb_xTa_{(1-x)}O_3$ ($0 \leq x \leq 1$) substrate.

7. A method for fabricating domain reversals as defined in claim 1, wherein the high energy beams are ion beams.

8. A method for fabricating domain reversals as defined in claim 7, wherein the ferroelectric material is a $LiNb_xTa_{(1-x)}O_3$ ($0 \leq x \leq 1$) substrate.

9. A method for fabricating domain reversals as defined in claim 8, wherein the ferroelectric material is a $LiNbO_3$ substrate, and a temperature of the heat treatment is set to a range between 100 degrees Centigrade and 700 degrees Centigrade.

10. A method for fabricating domain reversals as defined in claim 8, wherein the ferroelectric material is a $LiNbO_3$ substrate, and a temperature of the heat treatment is set to a range between 100 degrees Centigrade and 600 degrees Centigrade.

11. A method for fabricating domain reversals as defined in claim 7, wherein the ferroelectric material is a MgO-$LiNb_xTa_{(1-x)}O_3$ ($0 \leq x \leq 1$) substrate.

12. A method for fabricating domain reversals as defined in claim 1, wherein the ferroelectric material is a $LiNb_xTa_{(1-x)}O_3$ ($0 \leq X \leq 1$) substrate.

13. A method for fabricating domain reversals as defined in claim 12, wherein the ferroelectric material is a $LiNbO_3$ substrate, and a temperature of the heat treatment is set to a range between 100 degrees Centigrade and 700 degrees Centigrade.

14. A method for fabricating domain reversals as defined in claim 12, wherein the ferroelectric material is a $LiTaO_3$ substrate, and a temperature of the heat treatment is set to a range between 100 degrees Centigrade and 600 degrees Centigrade.

15. A method for fabricating domain reversals as defined in claim 1, wherein the ferroelectric material is a MgO-$LiNb_xTa_{(1-x)}O_3$ ($0 \leq X \leq 1$) substrate.

16. A method for fabricating domain reversals as defined in claim 1, wherein said exposing step comprises the step of inverting the direction of polarization of said ferroelectric material below said exposed surface areas, and said heat treatment comprises the step of heating said ferroelectric material such that the refractive index of said ferroelectric material having inverted polarization regions is rendered uniform.

17. A method for fabricating domain reversals as defined in claim 16, wherein said heat treatment comprises the step of varying a temperature at a rate of 30 degrees Centigrade per minute.

18. A method for fabricating domain reversals as defined in claim 1, wherein said heat treatment comprises the steps of:

heating said ferroelectric material to a predetermined temperature below the Curie temperature of said ferroelectric material; and maintaining said predetermined temperature for about two hours.

19. A method for fabricating domain reversals as defined in claim 1, wherein said heat treatment comprises the step of naturally cooling said ferroelectric material.

* * * * *